US010358523B2

(12) United States Patent
Sanz

(10) Patent No.: US 10,358,523 B2
(45) Date of Patent: Jul. 23, 2019

(54) NON-HOT-MELT MDI-BASED POLYURETHANE COMPOSITION BEARING NCO END GROUPS AND HAVING A LOW CONTENT OF MDI MONOMER, COMPRISING AT LEAST ONE ISOCYANATE COMPOUND OF PARTICULAR MOLAR VOLUME

(71) Applicant: BOSTIK SA, La Plaine Saint Denis (FR)

(72) Inventor: Federico Sanz, Choisy au Bac (FR)

(73) Assignee: BOSTIK SA, La Plaine Saint Denis (FR)

( * ) Notice: Subject to any disclaimer, the term of this patent is extended or adjusted under 35 U.S.C. 154(b) by 0 days.

(21) Appl. No.: 14/722,644

(22) Filed: May 27, 2015

(65) Prior Publication Data

US 2015/0344614 A1 Dec. 3, 2015

(30) Foreign Application Priority Data

May 28, 2014 (FR) ...................................... 14 54822

(51) Int. Cl.

| | |
|---|---|
| ***C08G 18/82*** | (2006.01) |
| ***C08G 18/48*** | (2006.01) |
| ***C08G 18/73*** | (2006.01) |
| ***C08G 18/75*** | (2006.01) |
| ***C08G 18/76*** | (2006.01) |
| ***C08G 18/10*** | (2006.01) |
| ***C08G 18/30*** | (2006.01) |
| ***C09J 175/08*** | (2006.01) |

(52) U.S. Cl.

CPC ............. *C08G 18/82* (2013.01); *C08G 18/10* (2013.01); *C08G 18/307* (2013.01); *C08G 18/4812* (2013.01); *C08G 18/4845* (2013.01); *C08G 18/73* (2013.01); *C08G 18/755* (2013.01); *C08G 18/758* (2013.01); *C08G 18/7642* (2013.01); *C08G 18/7671* (2013.01); *C09J 175/08* (2013.01); *C08G 2170/40* (2013.01)

(58) Field of Classification Search

CPC .. C08G 18/10; C08G 18/307; C08G 18/7671; C08G 18/83

USPC .......................................................... 525/457

See application file for complete search history.

(56) References Cited

U.S. PATENT DOCUMENTS

| | | | | |
|---|---|---|---|---|
| 4,882,408 A | 11/1989 | Blum | | |
| 6,515,164 B1 * | 2/2003 | Bolte | B32B 7/12 | 560/25 |
| 7,601,239 B1 * | 10/2009 | Cercone | C04B 37/008 | 156/325 |
| 9,290,606 B2 * | 3/2016 | Ulkem | C08G 18/10 | |
| 2006/0020101 A1 * | 1/2006 | Wintermantel | C08G 18/10 | 528/44 |
| 2007/0129525 A1 | 6/2007 | Eichelmann et al. | | |
| 2011/0132551 A1 * | 6/2011 | Klapdohr | B01D 1/223 | 159/49 |
| 2012/0225225 A1 * | 9/2012 | Franken | C08G 18/10 | 428/34.1 |
| 2013/0059973 A1 * | 3/2013 | Wamprecht | C08G 18/10 | 524/590 |

FOREIGN PATENT DOCUMENTS

| | | | | |
|---|---|---|---|---|
| DE | 102008025793 A1 | 12/2009 | | |
| EP | 0300388 A2 | 1/1989 | | |
| WO | 2005/097861 A1 | 10/2005 | | |
| WO | 2011/051019 A1 | 5/2011 | | |
| WO | WO-2012087897 A1 * | 6/2012 | C08G 18/10 | |

OTHER PUBLICATIONS

Search Report dated Jan. 22, 2015 issued in corresponding FR 1454822 application (pp. 1-2).

English Translation Abstract of DE 102008025793 published Dec. 3, 2009.

* cited by examiner

*Primary Examiner* — Michael M Dollinger

(74) *Attorney, Agent, or Firm* — Millen, White, Zelano and Branigan, P.C.

(57) ABSTRACT

1) Polyurethane composition comprising:

a) at least 98% by weight of at least one non-hot-melt polyurethane bearing NCO end groups based on diphenyl methane diisocyanates (MDI), b) a MDI monomer content of less than or equal to 1% by weight, c) at least one particular isocyanate compound with a molar volume of less than or equal to 300 milliliters per mole.

2) Process for preparing a polyurethane composition as defined previously, and an adhesive, mastic and/or surface coating composition formulated from such a polyurethane composition.

3 Claims, No Drawings

NON-HOT-MELT MDI-BASED POLYURETHANE COMPOSITION BEARING NCO END GROUPS AND HAVING A LOW CONTENT OF MDI MONOMER, COMPRISING AT LEAST ONE ISOCYANATE COMPOUND OF PARTICULAR MOLAR VOLUME

The present invention relates to a composition based on non-hot-melt diphenylmethane diisocyanate (MDI)-based polyurethane bearing NCO end groups, and having a low content of MDI monomer derived from the synthesis of said polyurethane, comprising at least one isocyanate compound in a particular molar volume as described subsequently (noted compound (A)).

By virtue of the presence of said compound (A), the polyurethane composition according to the invention has improved stability in terms of viscosity, reflected by a reduced increase in viscosity over time.

The present invention also relates to the use of such a polyurethane composition for manufacturing an adhesive, mastic and/or surface coating composition, especially for the construction field, which is stable over time in terms of viscosity.

The present invention also relates to a process for preparing such compositions according to the invention that are stable over time in terms of viscosity, characterized in that compound (A) (or all of the compounds (A)) is added in post-synthesis of the non-hot-melt polyurethanes bearing NCO end groups based on diphenylmethane diisocyanate (MDI) into a composition with a low content of MDI monomer comprising said polyurethane(s).

To satisfy the need of the greatest number, it is sought to develop surface coating, mastic and adhesive compositions that may be used or applied at low temperature (between 5 and 35° C.) and especially at low temperature (23° C.).

Many surface coating, mastic and adhesive compositions that are available on the market are manufactured from MDI-based reactive polyurethanes, especially bearing isocyanate end groups which crosslink in the presence of moisture.

However, these compositions generally have the drawback of comprising large contents of MDI originating from the polyurethane synthesis reaction, which are liable to lead to a certain number of drawbacks, among which are toxicity problems.

The preparation of MDI-based polyurethanes bearing NCO end groups is conventionally performed by reaction of a polyol with a stoichiometric excess of MDI. This stoichiometric excess may be reflected by an NCO/OH mole ratio (noted “NCO/OH ratio”) strictly greater than 1, which corresponds to the mole ratio of the number of isocyanate (NCO) groups to the number of hydroxyl (OH) groups borne by the reactive species bearing such functions, used in the preparation of the polyurethane. Said stoichiometric excess is necessary for obtaining isocyanate end groups on the polyurethane. Depending on the chosen NCO/OH mole ratio, the polyurethane synthesized is obtained with a more or less large excess of residual MDI monomer, corresponding to the MDI monomer that is unreacted at the end of reaction.

In order to reduce the drawbacks associated with the presence of a high content of MDI, studies have been conducted to synthesize MDI-based polyurethanes bearing NCO end groups with a minimum amount of residual MDI monomer.

However, it has been observed that polyurethane compositions having an MDI monomer content of less than or equal to 1% by weight relative to the weight of the polyurethane composition are highly viscous at room temperature and have problems of stability over time in terms of viscosity.

Specifically, these polyurethane compositions with a low content of MDI monomer have a limited storage life and their viscosity rapidly increases over time, until they become too viscous to be able to be formulated in the form of a surface coating composition, an adhesive composition or a mastic composition, which may be used or applied at low temperature (5-35° C.) and especially at room temperature (23° C.).

It is known practice to use diluents such as hydrocarbon-based organic solvents or plasticizers to reduce the viscosity of polyurethane compositions bearing NCO end groups with a low content of residual diisocyanate monomer. However, these diluents have the drawback of needing to be used in large amounts which is generally undesired. In addition, these diluents do not efficiently stabilize the evolution of viscosity of such polyurethane compositions, especially in the long term.

Alternatively, patent application WO 2011/051019 has proposed to add a $C_2$-$C_{24}$ monocarboxylic or dicarboxylic acid ester to reduce the viscosity of a polyurethane composition bearing NCO end groups with a low content of residual diisocyanate monomer. In the examples, it was demonstrated that by adding 5% to 6% by weight of a particular ester to a TDI-based polyurethane composition bearing NCO end groups with a low content of residual TDI monomer, the viscosity of the composition changed very little or not at all over time after one week at 40° C.

However, the efficacy of this stabilization remains to be improved, especially in the light of the amounts of stabilizer used and/or of the stabilization time.

Moreover, no stabilizing effect was demonstrated on MDI-based polyurethane compositions bearing NCO end groups with a low content of residual MDI monomer, since these compositions are generally more unstable in terms of viscosity than compositions based on TDI-based polyurethane bearing NCO end groups with a low content of residual TDI.

Thus, there is a need to provide an MDI-based polyurethane composition bearing NCO end groups, which has an MDI content of less than or equal to 1% by weight relative to the weight of the polyurethane composition, which does not have any or some of the drawbacks of the prior art.

In particular, there is a need to provide an MDI-based polyurethane composition bearing NCO end groups which has an MDI content of less than or equal to 1% by weight relative to the weight of said composition, which may be stabilized efficiently in terms of viscosity, especially using a lower total content of stabilizer when compared with the prior art.

There is also a need to provide an MDI-based polyurethane composition bearing NCO end groups which has an MDI content of less than or equal to 1% by weight relative to the weight of said composition, which is sufficiently stable in terms of viscosity to be able to be used at low temperature (5-35° C.) and especially at room temperature (23° C.) even after long periods of storage (for example 2-4 weeks at 20-40° C. under anhydrous conditions).

Moreover, there is a need to formulate an adhesive, mastic and/or surface coating composition comprising at least one MDI-based polyurethane bearing NCO end groups with an MDI content of less than or equal to 1% by weight relative to the weight of said composition, which is sufficiently stable in terms of viscosity to be able to be used, and especially extruded or applied, easily at low temperature (5-35° C.) and especially at room temperature (23° C.), even after long periods of storage.

There is also a need to formulate an adhesive, mastic and/or surface coating composition comprising at least one MDI-based polyurethane bearing NCO end groups and an MDI content of less than or equal to 1% by weight relative to the weight of said composition, which moreover has satisfactory mechanical properties (elasticity, modulus and cohesion).

Surprisingly, it has been found that the addition of at least one isocyanate compound with a molar volume of less than or equal to 300 mL/mol (compound (A)) to a composition comprising at least one MDI-based non-hot-melt polyurethane bearing NCO end groups and an MDI content of less than or equal to 1% by weight relative to the weight of said composition, makes it possible to satisfy all or some of these needs.

In particular, it has been found that the addition of at least one compound (A) makes it possible to efficiently and satisfactorily reduce the increase in viscosity over time of a polyurethane composition comprising at least one MDI-based non-hot-melt polyurethane bearing NCO end groups and an MDI content of less than or equal to 1% by weight relative to the weight of said composition, thus making it possible to obtain compositions that are stable enough to be able to be readily used at low temperature (5-35° C.) and especially at room temperature (23° C.), even after long periods of storage (for example 2-4 weeks at 20-40° C. under anhydrous conditions).

Moreover, it has been found that the addition of at least one compound (A) to an adhesive, mastic and/or surface coating composition formulated using a polyurethane composition comprising at least one MDI-based non-hot-melt polyurethane bearing NCO end groups and an MDI content of less than 1% by weight relative to the weight of the polyurethane composition, in any of its preparation steps, subsequent to the addition of said polyurethane composition to the adhesive, mastic and/or surface coating composition, makes it possible to obtain the same advantages as mentioned above.

In addition, it has been observed that the use of a small amount of compound(s) (A) sufficed to obtain stabilization of the viscosity of a polyurethane composition comprising at least one MDI-based non-hot-melt polyurethane bearing NCO end groups and an MDI content of less than or equal to 1% by weight relative to the weight of the polyurethane composition, thus making it possible to formulate surface coating, mastic and/or adhesive compositions, suited especially to the construction field, which are stable over time in terms of viscosity and which have satisfactory mechanical properties and applicative properties (extrusion or coating). In particular, said properties do not undergo any substantial degradation consecutive to the addition of compound(s) (A).

The present patent application thus relates to the use of at least one compound (A) comprising at least one isocyanate group and having a molar volume of less than or equal to 300 milliliters per mole (mL/mol) as viscosity stabilizer of a polyurethane composition comprising at least one MDI-based non-hot-melt polyurethane bearing NCO end groups and an MDI content of less than or equal to 1% by weight relative to the weight of the polyurethane composition. Such a stabilizer is capable by itself, without the need for viscosity stabilizers of the prior art in the amounts prescribed by the prior art, of reducing the increase in viscosity over time of a polyurethane composition comprising at least one MDI-based non-hot-melt polyurethane bearing NCO end groups and an MDI content of less than or equal to 1% by weight relative to the weight of the polyurethane composition.

The present patent application also relates to the use of at least one compound (A) as viscosity stabilizer for an adhesive, mastic and/or surface coating composition formulated using a polyurethane composition comprising at least one MDI-based non-hot-melt polyurethane bearing NCO end groups and an MDI content of less than or equal to 1% by weight relative to the weight of the polyurethane composition.

Other subjects and characteristics of the present invention will emerge more clearly on reading the description and the examples.

In the present patent application, in the absence of indications to the contrary:

- the viscosity is measured at room temperature (23° C.). The viscosity measurement at 23° C. may be performed using a Brookfield viscometer according to standard ISO 2555. Typically, the measurement performed at 23° C. may be done using a Brookfield RVT viscometer, with a needle adapted to the viscosity range and at a spin speed of 20 revolutions per minute (rpm);
- the weight-average molar masses, expressed in daltons (Da), are determined by gel permeation chromatography (GPC), the column being calibrated with polyethylene glycol (PEG) standards;
- the various embodiments of the compositions according to the invention, intended to be used as adhesive, mastic and/or surface coating compositions, described in the present patent application, may be combined with each other, in so far as the intended use is the same (adhesive, mastic or surface coating).

A subject of the present patent application is, firstly, a polyurethane composition comprising:

a) at least 98% by weight of at least one non-hot-melt polyurethane bearing NCO end groups based on diphenylmethane diisocyanate (MDI), b) a content of MDI monomer of less than or equal to 1% by weight, c) at least one isocyanate compound with a molar volume of less than or equal to 300 milliliters per mole (mL/mol) (noted compound (A)), the weight percentages being expressed relative to the total weight of the polyurethane composition.

The MDI-based polyurethane(s) bearing NCO end groups according to the invention are non-hot-melt, i.e. they are not solid at a temperature ranging from 5 to 35° C., and especially at room temperature (23° C.). In particular, they have a viscosity measured at 23° C. of less than or equal to 300 000 mPa·s, preferably less than or equal to 250 000 mPa·s, more preferentially ranging from 100 to 200 000 mPa·s and better still ranging from 4000 to 150 000 mPa·s (millipascal-seconds). Such polyurethanes are sufficiently fluid at a temperature ranging from 5 to 35° C. to be able to be readily used in this temperature range with the aid of application and/or mixing devices usually used in the field of adhesives, mastics and/or coatings, as illustrated especially in the examples of the present patent application.

The MDI-based polyurethane composition bearing NCO end groups with a low content of MDI, not stabilized, which may be used according to the invention for preparing a stable polyurethane composition according to the invention may be obtained via a polyaddition reaction of a composition consisting of polyisocyanate(s) comprising at least MDI, and of a composition consisting of polyol(s), at a temperature of less than 95° C., preferably ranging from 65 to 90° C., more preferentially from 80 to 85° C., under anhydrous conditions, with or without a reaction catalyst, in amounts of polyisocyanate(s) and of polyol(s) leading to an NCO/OH ratio noted r1 ranging from 1.60 to 1.95. This preparation process makes it possible to synthesize an MDI-based polyurethane bearing NCO end groups with little residual MDI monomer. The MDI content at the end of reaction is generally less than or equal to 1% by weight relative to the weight of the reaction medium. In particular, by reducing the NCO/OH ratio in the abovementioned range of values, it is possible to obtain an MDI-based polyurethane composition bearing NCO end groups with a very low MDI content below the limit of 1% by weight indicated above. The ratio r1 may thus range from 1.60 to 1.90, preferably from 1.60 to 1.85, in particular from 1.60 to 1.75 and better still from 1.60 to 1.70. Preferably, this ratio is chosen so as to obtain an MDI-based polyurethane composition bearing NCO end groups with an MDI content of less than or equal to 0.8% by weight and more preferentially less than or equal to 0.5% by weight relative to the weight of the reaction medium.

The weight amounts of reagents to be loaded into the reactor to synthesize the MDI-based polyurethane composition bearing NCO end groups with a low content of MDI used according to the invention are determined on the basis of the ratio r1, and also, as regards polyols, on the basis of their number-average molar mass and their functionality, or as regards polyisocyanates, on the basis of their content of isocyanate groups (% NCO expressed as a weight percentage relative to the weight of polyisocyanate).

The abovementioned polyisocyanate composition may consist of MDI alone or mixed with one or more polyisocyanate monomers other than MDI. These polyisocyanate monomers may be chosen from those usually used in the synthesis of a polyurethane bearing NCO end groups, preferably from diisocyanate monomers other than MDI, and more preferentially from toluene diisocyanate (TDI), isophorone diisocyanate (IPDI) and hexamethylene diisocyanate (HDI).

The MDI used may be in the form of an isomer or a mixture of isomers, such as 4,4'-MDI and/or 2,4'-MDI. Preferably, the MDI used consists to at least 90% by weight, and better still to at least 95% by weight, of 4,4'-MDI isomer relative to the total weight of MDI.

More preferentially, the polyisocyanate composition consists of one or more MDI isomers and of at least 90% by weight, and better still at least 95% by weight, of 4,4'-MDI relative to the weight of the polyisocyanate composition.

The abovementioned polyol composition may consist of a polyol or a mixture of polyols. In particular, the polyol(s) that may be used may be chosen from those with a number-average molar mass ranging from 1000 to 18 000 g/mol and more particularly those with a number-average molar mass ranging from 1000 to 8000 g/mol.

The polyol composition preferably consists of one or more polyethers, and more preferentially of at least one polyether triol.

Better still, the polyol composition is a mixture of polyether diol and triol, such as polypropylene glycol triol and polypropylene glycol diol.

The polyisocyanate composition and the polyol composition used in the process for preparing the MDI-based polyurethane bearing NCO end groups used according to the invention are preferably chosen so as to obtain a non-hot-melt MDI-based polyurethane bearing NCO end groups, especially having a viscosity as described above.

The reaction catalyst(s) that may be used may be any catalyst known to those skilled in the art for catalysing the formation of polyurethane by reaction of at least one polyisocyanate and of at least one polyol.

The content of MDI-based polyurethane bearing NCO end groups is preferably at least 98.5% by weight, more preferentially at least 99% by weight relative to the total weight of the polyurethane composition according to the invention.

The content of MDI monomer in the polyurethane composition according to the invention is preferably less than or equal to 0.8% by weight and more preferentially less than or equal to 0.5% by weight relative to the total weight of the polyurethane composition according to the invention.

The principle of the analytical method for determining the concentration of residual diisocyanate (MDI) monomers is based on the specific reaction of the isocyanate group NCO with an amine (1-(2-methoxyphenyl)piperazine or PPZ) to form stable urea derivatives. These derivatives are obtained during the preparation of the sample to be analysed by dilution/dissolution of this sample using an acetonitrile solution containing 0.02 mol/L of PPZ. The PPZ derivatives formed from the isocyanates contained in the sample to be analysed are then assayed with a C18 reverse-phase high-performance liquid chromatography (HPLC) system with a gradient of mobile phase comprising a mixture of water and acetonitrile buffered with an aqueous solution of tetrabutylammonium disulfate at 0.2% by weight, at a pH ranging from 2 to 3, equipped with an ultraviolet (UV) detector functioning at 254 nm. These compounds are identified and quantified by comparing their reaction time and their surface area of chromatographic peaks with those of the standard PPZ derivatives obtained by reaction of a diisocyanate monomer (MDI) of known nature and concentration.

The sample to be analysed may be a polyurethane composition as described previously, before or after stabilization with compound (A).

The sample to be analysed may also be an adhesive, mastic and/or surface coating composition according to the invention formulated from said polyurethane composition.

The compound(s) (A) used according to the invention are other than MDI. Preferably, the compound(s) (A) are also other than the other polyisocyanate(s) optionally used for the synthesis of the MDI-based polyurethane bearing NCO end groups according to the invention.

The compound(s) (A) used according to the invention preferably have a molar volume of less than or equal to 250 mL/mol, more preferentially less than or equal to 200 mL/mol.

The molar volume of compound (A) is defined as the ratio of the molar mass, expressed in grams per mole (g/mol) to the mass per unit volume of said compound (measured at a temperature ranging from 20 to 25° C. and at atmospheric pressure of 1 bar), expressed in grams per milliliter (g/mL).

The compound(s) (A) used according to the invention preferably have a molar mass of less than or equal to 300 g/mol.

The compound(s) (A) used according to the invention are preferably chosen from monoisocyanates and diisocyanates.

The compound(s) (A) used according to the invention may be used in the form of a single compound or of a mixture of at least two compounds. Preferably, it is used in the form of a single compound.

The compound(s) (A) used according to the invention may be aromatic or aliphatic, linear or branched, cyclic or acyclic, and saturated or unsaturated.

The compound(s) (A) used according to the invention are advantageously chosen from isocyanate compounds in which the isocyanate group(s) are not linked to a carbon atom of an aromatic hydrocarbon-based ring, for example a six-membered ring, such as a phenyl. These compounds have a reduced toxicological risk when compared with those in which at least one isocyanate group is linked to a carbon atom of an aromatic hydrocarbon-based ring, for example a six-membered ring, such as a phenyl. Specifically, the hydrolysis of the latter aromatic compounds leads to amines that may have toxicological risks to man and his environment.

In particular, the compound(s) (A) used according to the invention are advantageously chosen from isocyanate compounds in which the isocyanate group(s) are not linked to an sp2 hybridized carbon atom.

Among the compounds (A) that may be used according to the invention, it is preferred to use, alone or as a mixture:

aliphatic, acyclic, linear or branched monoisocyanates, for instance:

hexyl isocyanate (of molar volume equal to 145.7 mL/mol and of molar mass equal to 127.2 g/mol)

$CH_3(CH_2)_4CH_2NCO$, octyl isocyanate (of molar volume equal to 176.4 mL/mol and of molar mass equal to 155.2 g/mol)

$CH_3(CH_2)_6CH_2NCO$, decyl isocyanate (of molar volume equal to 208.3 mL/mol and of molar mass equal to 183.3 g/mol)

$CH_3(CH_2)_8CH_2NCO$, dodecyl isocyanate (of molar volume equal to 241 mL/mol and of molar mass equal to 211.3 g/mol)

$CH_3(CH_2)_{10}CH_2NCO$, benzyl monoisocyanates, i.e. monoisocyanates comprising in their structure a benzyl group and in which the isocyanate group is linked to the carbon atom of the methyl group substituting the phenyl group, for instance:

benzyl isocyanate (of molar volume equal to 123.5 mL/mol and of molar mass equal to 133.2 g/mol)

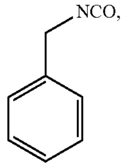

α-methylbenzyl isocyanate (of molar volume equal to 140.8 mL/mol and of molar mass equal to 147.2 g/mol)

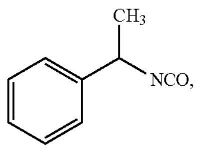

2-methylbenzyl isocyanate, 3-methylbenzyl isocyanate, 4-methylbenzyl isocyanate (of molar volume equal to 139 to 140 mL/mol and of molar mass equal to 147.2 g/mol)

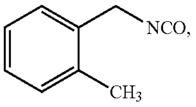

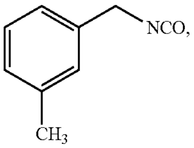

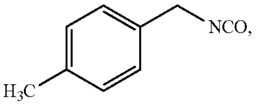

cycloaliphatic monoisocyanates, especially the hydrogenated forms of cyclic aromatic monoisocyanates and in particular the hydrogenated forms of benzyl monoisocyanates, for instance:

the hydrogenated form of benzyl isocyanate or cyclohexanemethyl isocyanate (of molar volume equal to 142.9 mL/mol and of molar mass equal to 139.2 g/mol)

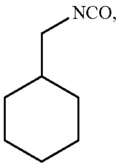

the hydrogenated form of α-methylbenzyl isocyanate (of molar volume equal to 149.9 mL/mol and of molar mass equal to 153.2 g/mol)

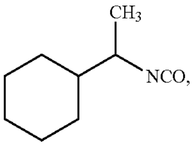

the hydrogenated form of naphthyl isocyanate isomers (HNI), such as hydrogenated 1-napthyl isocyanate and its isomers (of molar volume equal to 144 mL/mol and of molar mass equal to 179.3 g/mol)

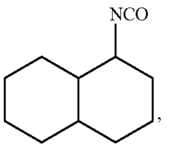

the hydrogenated form of the methylbenzyl isocyanate isomers, such as the hydrogenated forms of 2-methylbenzyl isocyanate, 3-methylbenzyl isocyanate, 4-methylbenzyl isocyanate (of molar volume equal to 149.9 mL/mol and of molar mass equal to 153.3 g/mol)

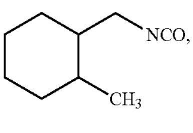

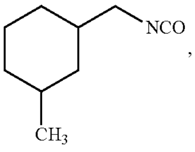

-continued

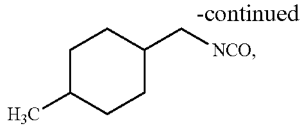

benzyl diisocyanates, i.e. diisocyanates comprising in their structure a benzyl group and in which at least one of the isocyanate groups is linked to the carbon atom of the methyl group substituting the phenyl group, for instance:

the xylene diisocyanate (XDI) isomers, such as meta-xylene diisocyanate (m-XDI) (of molar volume equal to 157 mL/mol and of molar mass equal to 138.2 g/mol)

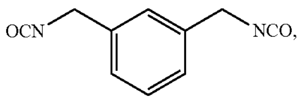

the tetramethylxylene diisocyanate (TMXDI) or bis(1-isocyanato-1-methyl-ethyl)benzene isomers, such as meta-tetramethylxylene diisocyanate (m-TMXDI) (of molar volume equal to 240 mL/mol and of molar mass equal to 244.3 g/mol)

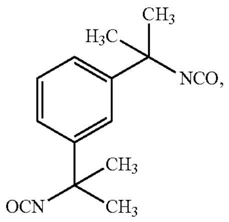

methylenebis(isocyanatomethylphenyl) isomers such as 1,1'-methanediylbis[4-(iso-cyanatomethyl)benzene] (of molar volume equal to 253.2 mL/mol and of molar mass equal to 278.3 g/mol)

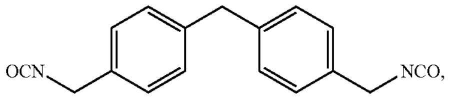

bis(isocyanatomethyl)naphthalene isomers such as 2,6-bis(isocyanatomethyl)-naphthalene (of molar volume equal to 204.9 mL/mol and of molar mass equal to 238.2 g/mol)

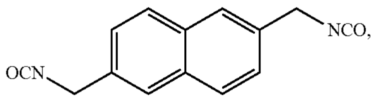

cycloaliphatic diisocyanates, especially the hydrogenated forms of cyclic aromatic diisocyanates and in particular the hydrogenated forms of benzyl diisocyanates, for instance:

the hydrogenated form of the xylene diisocyanate (HXDI) or bis(isocyanatomethyl)cyclohexane isomers, such as hydrogenated meta-xylene diisocyanate (m-HXDI) and its isomers (of molar volume equal to 176 mL/mol and of molar mass equal to 194.2 g/mol)

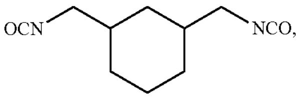

the hydrogenated form of tetramethylxylene diisocyanate (TMXDI) or bis(1-isocyanato-1-methylethyl)benzene isomers, such as the hydrogenated form of meta-tetramethylxylene diisocyanate (m-TMXDI) (of molar volume equal to 240.7 mL/mol and of molar mass equal to 250.3 g/mol)

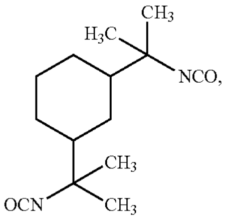

the methylenebis(isocyanatomethylcyclohexyl) isomers such as 1,1'-methanediylbis[4-(isocyanatomethyl)cyclohexane] (of molar volume equal to 253.2 mL/mol and of molar mass equal to 290.4 g/mol)

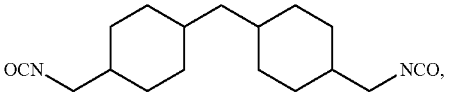

the bis(isocyanatomethyl)decahydronaphthalene isomers such as 2,6-bis-(isocyanatomethyl)decahydronaphthalene (of molar volume equal to 204.9 mL/mol and of molar mass equal to 248.3 g/mol)

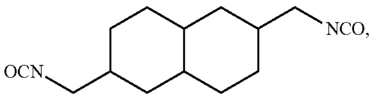

isophorone diisocyanate (IPDI) (of molar volume equal to 246 mL/mol and of molar mass equal to 222.3 g/mol)

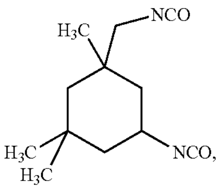

the hydrogenated forms of the toluene diisocyanate (HTDI) isomers, such as the hydrogenated forms of 2,4-TDI and of 2,6-TDI (of molar volume equal to 160.2 mL/mol and of molar mass equal to 180.2 g/mol)

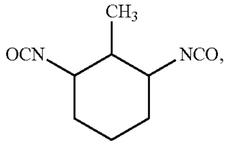
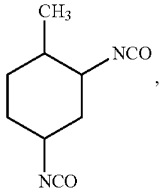
, cyclohexylene diisocyanate isomers such as 1,4-cyclohexylene diisocyanate (of molar volume equal to 137.3 mL/mol and of molar mass equal to 166.2 g/mol)

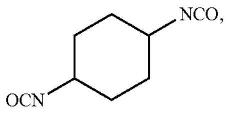

the hydrogenated forms of the naphthalene diisocyanate (HNDI) isomers such as the hydrogenated form of 1,5-HNDI (of molar volume equal to 144 mL/mol and of molar mass equal to 220.3 g/mol)

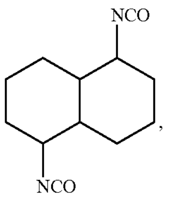

the hydrogenated forms of the dimethyldiphenylmethane diisocyanate isomers such as the hydrogenated form of 3,3'-dimethyl-4,4'-diphenyl diisocyanate (molar volume equal to 235 mL/mol and molar mass equal to 276.4 g/mol)

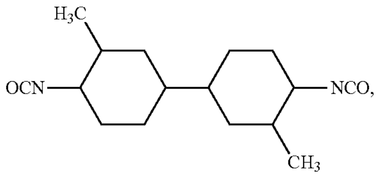

the hydrogenated forms of the diphenylmethane diisocyanate or methylenebis(cyclohexyl isocyanate) (HMDI) isomers such as the hydrogenated form of 4,4'-MDI (of molar volume equal to 212 mL/mol and of molar mass equal to 262.3 g/mol)

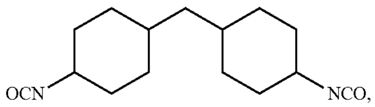

linear or branched acyclic aliphatic diisocyanates, for instance:

1,4-diisocyanatobutane (of molar volume equal to 126.8 mL/mol and of molar mass equal to 140.1 g/mol)

$OCN—(CH_2)_4—NCO$, hexamethylene diisocyanate (HDI) or 1,6-diisocyanatohexane (of molar volume equal to 161.7 mL/mol and of molar mass equal to 168.2 g/mol)

$OCN—(CH_2)_6—NCO$, 1,8-diisocyanatooctane (of molar volume equal to 194.9 mL/mol and of molar mass equal to 196.3 g/mol)

$OCN—(CH_2)_8—NCO$, 1,10-diisocyanatodecane (of molar volume equal to 229.8 mL/mol and of molar mass equal to 224.3 g/mol)

$OCN—(CH_2)_{10}—NCO$, 1,12-diisocyanatododecane (of molar volume equal to 268.5 mL/mol and of molar mass equal to 252.4 g/mol)

$OCN—(CH_2)_{12}—NCO$.

When the compound(s) (A) are chosen from monoisocyanates, it is preferred to use one or more monoisocyanates having a molar volume of less than or equal to 150 milliliters per mole (mL/mol).

Among all the compounds (A) that may be used, it is preferred to use XDI, IPDI and HMDI or a mixture thereof.

The total content of compound(s) (A) is not zero and preferably less than or equal to 2% by weight, more preferentially less than or equal to 1.5% by weight, in particular less than or equal to 1% by weight and better still less than or equal to 0.5% by weight relative to the total weight of the polyurethane composition according to the invention.

The total content of compound(s) (A) is also preferably greater than or equal to 0.01% by weight, more preferentially greater than or equal to 0.05% by weight relative to the total weight of the polyurethane composition according to the invention. Better still, the content of compound(s) (A) ranges from 0.10% to 1% by weight relative to the total weight of the polyurethane composition according to the invention.

The polyurethane composition according to the invention as described above may be used for manufacturing an adhesive, mastic and/or surface coating composition, especially for the construction field.

A subject of the present patent application is thus, secondly, a composition, which may be used as an adhesive, mastic and/or surface coating composition, comprising:

from 10% to 30% by weight, preferably from 15% to 20% by weight, of a polyurethane composition according to the invention as described in any of the preceding paragraphs, from 25% to 70% by weight of at least one filler, from 0.01% to 1% by weight of at least one crosslinking catalyst, the weight percentages being expressed relative to the total weight of the adhesive, mastic and/or surface coating composition.

The adhesive, mastic and/or surface coating compositions according to the invention have the advantage of being stable in terms of viscosity over long periods of storage (at least 2-3 weeks, under anhydrous conditions at 20-40° C.) and are in fact easy to use. In particular, the adhesive, mastic and/or surface coating compositions according to the invention have excellent extrusion or coating properties at room temperature with the aid of conventional devices for mixing and/or applying coating compositions, adhesive compositions or mastic compositions. An example of such an application device is described in the examples of the present patent application.

In addition, the adhesive, mastic and/or surface coating compositions according to the invention especially have good mechanical properties (especially elasticity and modulus) suited to their respective use, as adhesive, surface coating or mastic. Advantageously, these properties are not degraded after storage.

Preferably, the choice of the contents of ingredients in the adhesive, mastic and/or surface coating composition according to the invention, and especially the content of polyurethane composition according to the invention, is such that said adhesive, mastic and/or surface coating composition comprises a content of MDI monomer of less than 0.1% by weight relative to the total weight of the adhesive, mastic and/or surface coating composition.

By reducing the MDI content below this threshold, the adhesive, mastic and/or surface coating compositions according to the invention especially have toxicity risks that are reduced or negligible with respect to man and his environment.

Preferably, the choice of the contents of ingredients in the adhesive, mastic and/or surface coating composition according to the invention, and especially the content of compound(s) (A) of the polyurethane composition according to the invention, is such that the adhesive, mastic and/or surface coating composition according to the invention comprises a (total) content of compound(s) (A) of less than 0.5% by weight, and more preferentially less than 0.1% by weight, relative to the total weight of the adhesive, mastic and/or surface coating composition.

More preferentially, the content of MDI monomer is less than 0.1% by weight and the (total) content of compound(s) (A) is less than 0.5% by weight and better still less than 0.1% by weight relative to the total weight of the adhesive, mastic and/or surface coating composition according to the invention.

Thus, according to a preferred embodiment, the adhesive, mastic and/or surface coating composition may comprise, for example:

15% to 20% by weight relative to the total weight of the adhesive, mastic and/or surface coating composition, of a polyurethane composition according to the invention comprising:

a) at least 98% by weight relative to the weight of said polyurethane composition according to the invention, of at least one MDI-based non-hot-melt polyurethane bearing NCO end groups, as described in any of the preceding paragraphs, b) a content of MDI monomer of less than 0.5% by weight, relative the weight of said polyurethane composition according to the invention, c) from 0.01% to 1% by weight of at least one compound (A), relative to the weight of said polyurethane composition according to the invention, from 50% to 70% by weight of at least one filler, relative to the total weight of the adhesive, mastic and/or surface coating composition, from 0.01% to 1% by weight of at least one crosslinking catalyst, relative to the total weight of the adhesive, mastic and/or surface coating composition, from 5% to 25% by weight of at least one rheology agent relative to the total weight of the adhesive, mastic and/or surface coating composition.

The adhesive, mastic and/or surface coating composition according to this preferred embodiment of the invention comprises less than 0.1% by weight of MDI and less than 0.5% by weight of compound(s) (A), relative to the total weight of said composition.

According to a more preferred embodiment, the adhesive, mastic and/or surface coating composition may comprise:

from 15% to 20% by weight, relative to the total weight of the adhesive, mastic and/or surface coating composition, of a polyurethane composition according to the invention comprising:

a) at least 98% by weight relative to the weight of said polyurethane composition according to the invention, of at least one MDI-based non-hot-melt polyurethane bearing NCO end groups, as described in any one of the preceding paragraphs, b) a content of MDI monomer of less than 0.5% by weight relative to the weight of said polyurethane composition according to the invention, c) from 0.01% to less than 0.5% by weight of at least one compound (A), relative to the weight of said polyurethane composition according to the invention, from 50% to 70% by weight of at least one filler, relative to the total weight of the adhesive, mastic and/or surface coating composition, from 0.01% to 1% by weight of at least one crosslinking catalyst, relative to the total weight of the adhesive, mastic and/or surface coating composition, from 5% to 25% by weight of at least one rheology agent, relative to the total weight of the adhesive, mastic and/or surface coating composition.

The adhesive, mastic and/or surface coating composition according to this more preferred embodiment of the invention comprises less than 0.1% by weight of MDI and less than 0.1% by weight of compound(s) (A), relative to the total weight of said composition.

As crosslinking catalyst(s) that may be used in the adhesive, mastic and/or surface coating composition according to the invention, use may be made of any catalyst(s) known to those skilled in the art for catalysing the crosslinking of polyurethane bearing NCO end groups in the presence of water (or of moisture). The water or moisture may be provided by the surface of the support or the surrounding medium, in a natural manner (atmospheric moisture) or controlled manner (for example in a thermostatic chamber at a relative humidity between 40% and 70% at 23° C., or an oven ranging up to 150° C.) on contact with the composition according to the invention. This crosslinking is reflected by the creation, between the polymer chains of the polyurethane, of bonds of urea type which lead to the formation of a three-dimensional polymer network.

Use may be made, for example, of one or more crosslinking catalysts chosen from dioctyltin dilaurate, bismuth-based catalysts, or tertiary amine catalysts such as:

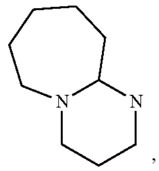
, 1,8-diazabicyclo
[5.4.0]undec-7-ene
(DBU)

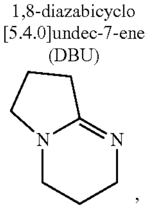
, 1,5-diazabicyclo
[4.3.0]non-5-ene
(DBN)

-continued

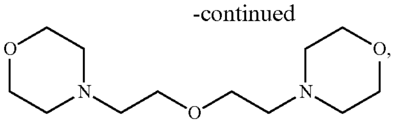

2.2′-diethylmorpholine ether (DMDEE)

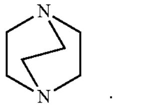

1,4-diazabicyclo
[2.2.2]octane
(DABCO)

These crosslinking catalysts have the advantage of not being carcinogenic, mutagenic or reprotoxic (CMR).

Preferably, the amount of crosslinking catalyst that may be used ranges from 0.05% to 0.5% by weight relative to the weight of the adhesive, mastic and/or surface coating composition according to the invention.

The filler(s) that may be used in the adhesive, mastic and/or surface coating composition according to the invention may be chosen from mineral fillers and mixtures of organic fillers and mineral fillers.

As examples of mineral fillers that may be used, use may be made of any mineral filler(s) usually used in the field of surface coating, adhesive or mastic compositions. These fillers are in the form of particles of diverse geometry. They may be, for example, spherical, fibrous, or may have an irregular shape.

Preferably, clay, quartz or carbonated fillers are used.

More preferentially, carbonated fillers are used, such as alkali metal or alkaline-earth metal carbonates, and more preferentially calcium carbonate.

These fillers may be natural or treated, for example with an organic acid such as stearic acid or a mixture of organic acids consisting predominantly of stearic acid.

Use may also be made of hollow mineral microspheres such as hollow glass microspheres, and more particularly those made of sodium calcium borosilicate or of aluminosilicate.

The amount of mineral filler that may be used may especially range from 20% to 65% by weight, preferably from 20% to 50% by weight and more preferentially from 25% to 40% by weight relative to the weight of the adhesive, mastic and/or surface coating composition according to the invention.

As examples of organic filler(s) that may be used, use may be made of any organic filler(s) and especially polymeric fillers usually used in the field of surface coating, adhesive or mastic compositions.

Use may be made, for example, of polyvinyl chloride (PVC), polyolefins, rubber, ethylene vinyl acetate (EVA), or aramid fibres such as Kevlar®.

Use may also be made of hollow microspheres made of expandable or non-expandable thermoplastic polymer. Mention may be made especially of hollow microspheres of vinylidene chloride/acrylonitrile.

PVC is preferably used.

The mean particle size of the filler(s) that may be used is preferably less than or equal to 10 microns, more preferentially less than or equal to 3 microns, so as to avoid their sedimentation in the adhesive, mastic and/or surface coating composition according to the invention during its storage.

The mean particle size is measured for a volume particle size distribution and corresponding to 50% by volume of the sample of particles analysed. When the particles are spherical, the mean particle size corresponds to the median diameter (D50 or Dv50) which corresponds to the diameter such that 50% of the particles by volume have a size smaller than said diameter. In the present patent application, this value is expressed in micrometers and determined according to standard NF ISO 13320-1 (1999) by laser scattering on a Malvern machine.

The adhesive, mastic and/or surface coating composition according to the invention may comprise at least one plasticizer in a proportion of from 5% to 20% by weight, preferably from 10% to 15% by weight, relative to the weight of the adhesive, mastic and/or surface coating composition according to the invention.

As examples of plasticizers that may be used, use may be made of any plasticizer usually used in the field of adhesive, mastic and/or surface coating compositions.

Use is preferably made of:

diisodecyl phthalate (DIDP)

an ester of an alkylsulfonic acid and of phenol, as sold under the name Mesamoll® by the company Lanxess diisononyl 1,2-cyclohexanedicarboxylate, as sold under the name Hexamoll Dinch® by the company BASF.

The adhesive, mastic and/or surface coating composition according to the invention may comprise at least one rheology agent.

As examples of rheology agents that may be used, mention may be made of any rheology agent usually used in the field of adhesive, mastic and/or surface coating compositions.

Use is preferably made of one or more rheology agents chosen from thixotropic agents, and more preferentially from:

PVC plastisols, corresponding to a suspension of PVC in a plasticizer that is miscible with PVC, obtained in situ by heating to temperatures ranging from 60° C. to 80° C. These plastisols may be those described especially in the publication *Polyurethane Sealants*, Robert M. Evans, ISBN 087762-998-6, fumed silica, urea derivatives derived from the reaction of an aromatic diisocyanate monomer such as 4,4'-MDI with an aliphatic amine such as butylamine. The preparation of such urea derivatives is described especially in patent application FR 1 591 172.

The total content of rheology agent(s) that may be used may range from 1% to 40% by weight, preferably from 5% to 30% by weight, more preferentially from 10% to 25% by weight, relative to the weight of the adhesive, mastic and/or surface coating composition according to the invention.

Preferably, the adhesive, mastic and/or surface coating composition according to the invention does not comprise any hydrocarbon-based organic solvent, such as those with a boiling point of less than 250° C. at atmospheric pressure, such as xylene.

The composition according to the invention may comprise at least one adjuvant chosen from adhesion promoters such as epoxysilanes, UV stabilizers (or antioxidants), pigments, colorants, and a mixture thereof. When these adjuvants are present in the composition, the total sum of their content is preferably less than or equal to 15% by weight relative to the total weight of the adhesive, mastic and/or surface coating composition according to the invention.

When the composition according to the invention is intended to be used as an adhesive composition, it may comprise at least one tackifying resin.

As examples of tackifying resin(s) that may be used, mention may be made of any tackifying resin usually used in the field of adhesive compositions.

Preferably, use is made of those with a weight-average molar mass ($M_W$) ranging from 200 to 5000 and preferably chosen from:

(i) rosins of natural or chemically modified origin, for instance rosin extracted from pine gum, wood rosin extracted from tree roots and hydrogenated, dimerized, polymerized derivatives thereof or derivatives esterified with monoalcohols or polyols such as glycerol, pentaerythritol or neopentyl glycol;

(ii) resins obtained by hydrogenation, polymerization or copolymerization (with an aromatic hydrocarbon) of mixtures of unsaturated aliphatic hydrocarbons containing approximately 5, 9 or 10 carbon atoms derived from petroleum fractions;

(iii) terpene resins generally resulting from the polymerization of terpene hydrocarbons, for instance monoterpenes (or pinene) in the presence of Friedel-Crafts catalysts, optionally modified by the action of phenols;

(iv) copolymers based on natural terpenes, for example styrene/terpene, α-methyl styrene/terpene and vinyltoluene/terpene.

The tackifying resin is chosen so as to be compatible with the polyurethane bearing NCO end groups used according to the invention, i.e. so that when it is mixed in proportions of 10%/90% with said polyurethane bearing NCO end groups, this gives a substantially homogeneous mixture. In particular, the mixture remains transparent (in the visible light spectrum—wavelength ranging from 380 to 780 nanometers, measured in a vacuum) and no phase separation or total or partial gelation is observed in the polyurethane/resin mixture.

The total amount of tackifying resin(s) that may be used may range from 5% to 10% by weight relative to the weight of the adhesive composition.

Preferably, the adhesive composition according to the invention comprises:

from 15% to 30% by weight of a polyurethane composition bearing NCO end groups according to the invention as described in any of the preceding paragraphs, from 40% to 65% by weight of at least one carbonate filler, from 0.01% to 1% by weight of at least one crosslinking catalyst, preferably less than 0.1% by weight of MDI monomer, preferably less than 0.5% by weight of compound(s) (A), the weight percentages being expressed relative to the weight of the adhesive composition.

When the composition according to the invention is intended to be used as a mastic composition, it preferably comprises:

from 20% to 30% by weight of a polyurethane composition bearing NCO end groups according to the invention as described in any of the preceding paragraphs, from 20% to 25% by weight of at least one carbonated filler, from 10% to 20% by weight, preferably from 15% to 20% by weight, of at least one organic filler and/or at least one rheology agent, from 0.01% to 1% by weight of at least one crosslinking catalyst, preferably less than 0.1% by weight of MDI monomer, preferably less than 0.5% by weight of compound(s) (A), the weight percentages being expressed relative to the weight of the mastic composition.

When the composition according to the invention is intended to be used as a surface coating composition, it preferably comprises:

from 20% to 25% by weight of a polyurethane composition bearing NCO end groups according to the invention as described previously, from 25% to 50% by weight of at least one carbonated filler, from 0.01% to 1% by weight of at least one crosslinking catalyst, preferably less than 0.1% by weight of MDI monomer, preferably less than 0.5% by weight of compound(s) (A), the weight percentages being expressed relative to the weight of the surface coating composition.

The adhesive, mastic or surface coating compositions according to the invention are formulated so as to be able to be used or applied at low temperature (between 5 and 35° C.) and especially at room temperature (23° C.).

A subject of the present invention is, thirdly, a process for preparing a composition according to the invention which is stable over time in terms of viscosity, comprising a step in which the compound(s) (A) and the other ingredient(s) optionally present in the composition according to the invention are mixed with an MDI-based non-hot-melt polyurethane composition bearing NCO end groups having a content of MDI of less than or equal to 1% by weight, preferably less than or equal to 0.8% by weight, and better still less than or equal to 0.5% by weight relative to the weight of said composition, at a temperature of less than or equal to 50° C., preferably ranging from 5 to 45° C. and better still ranging from 20 to 30° C.

The addition and mixing are performed under anhydrous conditions.

The compound(s) (A) used according to the invention may be added to the MDI-based hot-melt polyurethane(s), in the composition according to the invention, either directly after the end of the reaction for the synthesis of said polyurethane(s), or after one, several or all of the other ingredients of the composition according to the invention, as described previously, have been mixed with said polyurethane(s).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 14/54822, filed May 28, 2014 are incorporated by reference herein.

The examples that follow are given purely as illustrations of the invention and cannot be interpreted as limiting the scope thereof.

EXAMPLES

Preparation of the Polyurethane Compositions: Examples 1 to 3 (Reference)

The polyurethane compositions of Examples 1 to 3 were prepared by mixing the ingredients indicated in Table 1 at a temperature of less than or equal to 95° C. under anhydrous conditions. The amounts indicated in Table 1 are expressed as weight percentages relative to the total weight of the polyurethane composition of each of the examples.

TABLE 1

| Ingredients | 1 | 2 | 3 |
|---|---|---|---|
| PPG triol with a number-average molar mass of 4000 g/mol | 49.5 | 50.5 | 51.3 |
| PPG diol with a number-average molar mass of 2000 g/mol | 32.5 | 33.2 | 33.6 |
| 4,4'-MDI (% NCO = 33.6% by weight) | 18.1 | 16.2 | 15 |
| Catalyst | 0.1 | 0.1 | 0.1 |
| NCO/OH ratio | 2.01 | 1.78 | 1.61 |

Characterization:

For each of the polyurethane compositions of Examples 1 to 3 obtained:

The weight content of unreacted diisocyanate monomer present in the polyurethane synthesis medium is measured via an HPLC method equipped with a UV detector as described previously (C18 reverse phase, mobile phase: aqueous solution of acetonitrile, buffered with an aqueous solution containing 0.2% by weight of tetrabutylammonium bisulfate at a pH equal to 2.5, detection wavelength: 254 nm). The values measured are expressed as a weight percentage relative to the weight of the composition of each of Examples 1 to 3.

The viscosity of the polyurethane composition is measured at the end of reaction (D) and then 30 days after the end of the reaction (D+30) at 23° C. under anhydrous storage conditions. It is considered that after 30 days, the increase in viscosity over time of the polyurethane is negligible. The viscosity measurement is taken at 23° C. using a Brookfield RVT viscometer, with a number 6 needle at a spin speed of 20 revolutions per minute (rpm). The value measured is expressed in millipascal-seconds (mPa·s).

TABLE 2

| Characterization before stabilization | 1 | 2 | 3 |
|---|---|---|---|
| Residual MDI content calculated (in % by weight relative to the weight of the polyurethane composition) | >1 | ≤0.8 | ≤0.5 |
| Viscosity at 23° C. (mPa · s) (D) | 5500 | 5800 | 5200 |
| Viscosity at 23° C. (mPa · s) (D + 30) | 87 000 | 300 000 | 300 000 |

It is observed that after 30 days of storage under conditions identical to those mentioned above, the polyurethane compositions of Examples 2 and 3 obtained with a residual MDI monomer content of less than or equal to 1% by weight relative to the weight of the polyurethane composition have a viscosity about 3.5 times greater than that measured on the polyurethane composition of Example 1 obtained with a residual MDI monomer content of greater than 1% by weight relative to the weight of the polyurethane composition.

The viscosity of a polyurethane composition comprising a residual MDI monomer content of less than or equal to 1% by weight relative to the weight of the polyurethane composition thus changes more rapidly than that of a polyurethane composition comprising more than 1% by weight of residual MDI monomer relative to the weight of the polyurethane composition.

Stabilization of the Polyurethane Composition of Example 2: Examples 2A to 2I The compositions of Examples 2A to 2I are prepared by mixing the polyurethane composition of Example 2 (noted polyurethane 2) and a compound (A) of molar volume less than or equal to 300 mL/mol in accordance with the invention, or an isocyanate with a molar volume of greater than 300 mL/mol for comparative purposes. The nature and amounts of the ingredients used are indicated in Table 3 below. The amounts given in Table 3 are expressed in grams relative to the weight of the composition.

Characterization:

For each of the compositions of Examples 2A to 2F, the effect of adding a compound (A) with a molar volume of less than or equal to 300 mL/mol to the polyurethane composition of Example 2 judged as being unstable in terms of viscosity was evaluated.

For comparative purposes, for each of the compositions of Examples 2G to 2I, the effect of adding an isocyanate with a molar volume of greater than 300 mL/mol to the polyurethane composition of Example 2 judged as being unstable in terms of viscosity was evaluated.

For each of the compositions 2A to 2I, the percentage of stabilization observed at D+30 corresponding to the reduction in viscosity measured at 23° C., 30 days after adding the isocyanate compound to the polyurethane composition was calculated relative to the viscosity of the same composition not stabilized (composition of Example 2) observed at the same period and under the same conditions. This viscosity reduction is calculated via the following formula and is expressed as a percentage:

$$100-\left(\frac{\text{viscosity of the composition of Example 2}}{\text{viscosity of the composition of Example } 2i}\times 100\right)$$
$$\text{(with } i \text{ ranging from } A \text{ to } I\text{)}$$

When the addition of the isocyanate compound leads to a reduction in viscosity relative to the reference viscosity of Example 2, the percentage stabilization value is preceded by the sign "+" indicating a gain in stability relative to the reference (consisting of the composition of Example 2).

In the opposite case, the percentage stabilization value is preceded by the sign "−" indicating a loss of stability relative to said reference.

The viscosity measurements are performed under the same measuring conditions (apparatus and time) and storage conditions (anhydrous conditions) as previously for Examples 1 to 4. The results are indicated in Table 3 below.

Results:

It is observed that after 30 days of storage under conditions identical to those mentioned above, the compositions of Examples 2A to 2F according to the invention comprising a compound (A) with a molar volume of less than or equal to 300 mL/mol show a significant reduction in viscosity (in particular greater than or equal to 50%) relative to the viscosity measured on the non-stabilized polyurethane composition of Example 2.

On the other hand, it is observed that after 30 days of storage, the compositions of Comparative Examples 2G to 2I comprising a diisocyanate with a molar volume of greater than 300 mL/mol do not show any significant reduction in viscosity (less than or equal to 5%) relative to the viscosity measured on the non-stabilized polyurethane composition of Example 2.

Stabilization of the Polyurethane Composition of Example 3: Examples 3A to 3I The compositions of Examples 3A to 3I are prepared by mixing the polyurethane composition of Example 3 (noted polyurethane 3) and a compound (A) with a molar volume of less than or equal to 300 mL/mol in accordance with the invention, or a diisocyanate with a molar volume of greater than 300 mL/mol for comparative purposes. The nature and amounts of the ingredients used are indicated in Table 4 below. The amounts given in Table 4 are expressed in grams relative to the weight of the composition.

Characterization:

For each of the compositions of Examples 3A to 3F, the effect of adding a compound (A) with a molar volume of less than or equal to 300 mL/mol to the polyurethane composition of Example 3 judged as being unstable in terms of viscosity was evaluated.

For comparative purposes, for each of the compositions of Examples 3G to 3I, the effect of adding a diisocyanate with a molar volume of greater than 300 mL/mol to the polyurethane composition of Example 3 judged as being unstable in terms of viscosity was evaluated.

The viscosity measurements are performed under the same measuring and storage conditions as previously for Examples 1 to 4. The results are indicated in Table 4 below. The stabilization value expressed as a % is deduced therefrom as previously. The comparison is made this time relative to the viscosity of the reference composition, consisting of the composition of Example 3.

Results:

It is observed that after 30 days of storage under the abovementioned conditions, the compositions of the examples according to the invention 3A to 3F comprising a compound (A) with a molar volume of less than or equal to 300 mL/mol show a significant reduction in viscosity (in particular greater than or equal to 30%) relative to the viscosity measured on the non-stabilized polyurethane composition of Example 3.

On the other hand, it is observed that after 30 days under the abovementioned storage conditions, the compositions of Comparative Examples 3G to 3I comprising a diisocyanate with a molar volume of greater than 300 mL/mol do not show a significant reduction in viscosity (less than or equal to 5%) relative to the viscosity measured on the non-stabilized polyurethane composition of Example 3.

Examples of Stabilization of Mastic Compositions

The stabilizing effect of the addition of a compound A according to the invention to two different mastic compositions was tested, each composition comprising:

- from 20% to 30% by weight of a composition comprising at least 98% by weight of an MDI-based non-hot-melt polyurethane bearing NCO end groups with an MDI content such that the MDI content relative to the weight of the mastic composition is less than 0.1% by weight,
- from 20% to 25% by weight of carbonated filler,
- from 10% to 20% by weight of organic filler and/or rheology agent,
- from 0.01% to 1% by weight of a crosslinking catalyst.

For each of the mastic compositions tested, 0.1 g of XDI was added to 100 g of mastic composition, at a temperature of less than or equal to 50° C. and under anhydrous conditions.

Immediately after the end of mixing (t0) and 3 weeks after the end of mixing (t+3 weeks), the mastic compositions are extruded through an extrusion nozzle 4 mm in diameter under a pressure of 3 bar at constant temperature and hygrometry so as to evaluate their viscosity.

The viscosity measurement (in millipascal-seconds (mPa·s)) is performed at 23° C. at t0 and t+3 weeks using a Brookfield RVT viscometer, with a number 6 needle at a spin speed of 20 revolutions per minute (rpm).

For each of the mastic compositions tested, the improvement in the extrusion rate, expressed as a percentage, observed at t0 and at t+3 weeks following the addition of XDI was calculated relative to the rate observed without XDI stabilization.

It was observed that the addition of 0.1% of XDI to the mastic compositions led to satisfactory extrusion rates (greater than or equal to 70 g/mn) and better than those measured on the mastic compositions without XDI. A gain in extrusion rate of the order of 60% to 85% is observed relative to the non-stabilized mastic compositions, reflecting better stability in terms of viscosity of the stabilized mastic compositions according to the invention.

TABLE 3

| Ingredients | Examples 2 reference | 2A | 2B | 2C | 2D invention | 2E | 2F | 2G | 2H comparative | 2I |
|---|---|---|---|---|---|---|---|---|---|---|
| Polyurethane 2 | 100 | 100 | 100 | 100 | 100 | 100 | 100 | 100 | 100 | 100 |
| XDI (molar volume = 157 mL/mol) | — | 0.1 | 0.4 | — | — | — | — | — | — | — |
| IPDI (molar volume = 212 mL/mol) | — | — | — | 0.1 | 0.4 | — | — | — | — | — |
| HMDI (molar volume = 246 mL/mol) | — | — | — | — | — | 0.1 | 0.4 | — | — | — |
| Diisocyanate (molar volume = 621 mL/mol) | — | — | — | — | — | — | — | 0.1 | 0.4 | 1 |
| Residual MDI content calculated (in % by weight relative to the weight of the polyurethane composition) | ≤0.8 | ≤0.8 | ≤0.8 | ≤0.8 | ≤0.8 | ≤0.8 | ≤0.8 | ≤0.8 | ≤0.8 | ≤0.8 |
| Viscosity at 23° C. (mPa · s) (D) | 5800 | 5160 | 4640 | 5040 | 5100 | 4820 | 4800 | 4890 | 4960 | 5100 |
| Viscosity at 23° C. (mPa · s) (D + 30) | 300000 | 109000 | 100000 | 140000 | 130000 | 125000 | 115000 | 290000 | 310000 | 315000 |
| Stabilization (at D + 30) relative to the reference composition | 0% | +63.7% | +66.7% | +53.3% | +56.7% | +58.3% | +61.7% | +3.3% | −3.3% | −5.0% |

TABLE 4

| Ingredients | Examples | | | | | | | | | |
|---|---|---|---|---|---|---|---|---|---|---|
| | 3<br>reference | 3A | 3B | 3C<br>invention | 3D | 3E | 3F | 3G | 3H<br>comparative | 3I |
| Polyurethane 2 | 100 | 100 | 100 | 100 | 100 | 100 | 100 | 100 | 100 | 100 |
| XDI (molar volume = 157 mL/mol) | — | 0.3 | 0.8 | — | — | — | — | — | — | — |
| IPDI (molar volume = 212 mL/mol) | — | — | — | 0.3 | 0.8 | — | — | — | — | — |
| HMDI (molar volume = 246 mL/mol) | — | — | — | — | — | 0.3 | 0.8 | — | — | — |
| Diisocyanate (molar volume = 621 mL/mol) | — | — | — | — | — | — | — | 0.1 | 0.4 | 1 |
| Residual MDI content calculated (in % by weight relative to the weight of the polyurethane composition) | 0.5 | 0.5 | 0.5 | 0.5 | 0.5 | 0.5 | 0.5 | 0.5 | 0.5 | 0.5 |
| Viscosity at 23° C. (mPa · s) (D) | 5200 | 4800 | 4400 | 4800 | 4600 | 4800 | 4400 | 5600 | 4900 | 4650 |
| Viscosity at 23° C. (mPa · s) (D + 30) | 300 000 | 170000 | 130000 | 200000 | 180000 | 180000 | 130000 | 315000 | 289000 | 298000 |
| Stabilization (at D + 30) relative to the reference composition | 0% | +43.3% | +56.7% | +33.3% | +40% | +40% | +56.7% | −5.0% | +3.7% | +0.7% |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the preparation of a composition comprising:

a) at least 98% by weight of at least one non-hot-melt polyurethane bearing NCO end groups based on diphenylmethane diisocyanate noted MDI b) a content of MDI monomer of less than or equal to 1% by weight, c) at least one isocyanate compound with a molar volume of less than or equal to 300 milliliters per mole noted compound A, in which the isocyanate group or groups are not linked to a carbon atom of an aromatic hydrocarbon-based ring, the weight percentages being expressed relative to the total weight of the polyurethane composition, said process, comprising a step in which the compound or compounds A and other ingredient or ingredients optionally present in said composition, are mixed with a polyurethane composition comprising at least one polyurethane bearing NCO end groups based on MDI, which is not solid at a temperature ranging from 5 to 35° C., and a MDI content of less than or equal to 1% by weight relative to the weight of said polyurethane composition, at a temperature of less than or equal to 50° C., under anhydrous conditions in post-synthesis of said MDI-based polyurethane bearing NCO end groups.

2. The process according to claim 1 wherein the compound(s) (A) are mixed with said composition:

either directly after the end of the reaction for the synthesis of the polyurethane bearing NCO end groups based on MDI, or after one, several or all of the other ingredients of the composition have been mixed with the polyurethane bearing NCO end groups based on MDI.

3. A process for the preparation of a composition comprising:

a) at least 98% by weight of at least one non-hot-melt polyurethane bearing NCO end groups based on diphenylmethane diisocyanate noted MDI b) a content of MDI monomer of less than or equal to 1% by weight, c) at least one isocyanate compound with a molar volume of less than or equal to 300 milliliters per mole noted compound A, in which the isocyanate group or groups are not linked to a carbon atom of an aromatic hydrocarbon-based ring, compound A being an aliphatic, acyclic, linear or branched monoisocyanate, benzyl monoisocyanate, cycloaliphatic monoisocyanate, benzyl diisocyanate, cycloaliphatic diisocyanate, or a linear or branched acyclic aliphatic diisocyanate, the weight percentages being expressed relative to the total weight of the polyurethane composition, said process, comprising a step in which the compound or compounds A and other ingredient or ingredients optionally present in said composition, are mixed with a polyurethane composition comprising at least one polyurethane bearing NCO end groups based on MDI, which is not solid at a temperature ranging from 5 to 35° C., and a MDI content of less than or equal to 1% by weight relative to the weight of said polyurethane composition, at a temperature of less than or equal to 50° C., under anhydrous conditions in post-synthesis of said MDI-based polyurethane bearing NCO end groups.

* * * * *